United States Patent
Mahendran et al.

(10) Patent No.: US 8,325,688 B2
(45) Date of Patent: Dec. 4, 2012

(54) METHOD AND APPARATUS FOR POLICY CONTROL ENHANCEMENT IN A WIRELESS COMMUNICATION SYSTEM

(75) Inventors: Arungundram C. Mahendran, Irvine, CA (US); John Wallace Nasielski, San Diego, CA (US); Jun Wang, La Jolla, CA (US); Raymond Tah-Sheng Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 839 days.

(21) Appl. No.: 10/981,076

(22) Filed: Nov. 3, 2004

(65) Prior Publication Data
US 2005/0147072 A1 Jul. 7, 2005

Related U.S. Application Data (60) Provisional application No. 60/517,454, filed on Nov. 4, 2003.

(51) Int. Cl.
*H04L 1/00* (2006.01)
(52) U.S. Cl. ........ 370/338; 370/328; 370/341; 370/352; 370/395.5; 370/410; 455/450; 455/451; 455/405; 455/452.2
(58) Field of Classification Search ................ 370/352, 370/328, 338, 341, 468, 349, 410, 332, 395.5, 370/490, 395.21, 446; 705/64; 455/450–451, 455/452.2, 405
See application file for complete search history.

(56) References Cited

U.S. PATENT DOCUMENTS

| | | | | |
|---|---|---|---|---|
| 6,898,635 | B2 * | 5/2005 | Jung | 709/226 |
| 6,957,071 | B1 * | 10/2005 | Holur et al. | 455/452.2 |
| 7,330,487 | B2 * | 2/2008 | Chang et al. | 370/490 |
| 7,411,927 | B1 * | 8/2008 | Bhalla et al. | 370/331 |
| 2003/0014367 | A1 * | 1/2003 | Tubinis | 705/64 |
| 2003/0035401 | A1 * | 2/2003 | Shaheen et al. | 370/341 |
| 2004/0042423 | A1 * | 3/2004 | Borella et al. | 370/328 |
| 2004/0047366 | A1 * | 3/2004 | Chowdhury | 370/466 |
| 2004/0205193 | A1 * | 10/2004 | Hurtta et al. | 709/227 |
| 2004/0218607 | A1 * | 11/2004 | Hurtta et al. | 370/395.21 |
| 2005/0066040 | A1 * | 3/2005 | Borella et al. | 709/228 |

FOREIGN PATENT DOCUMENTS

| | | |
|---|---|---|
| TW | 493324 B | 7/2002 |
| TW | 508954 B | 11/2002 |
| TW | 510104 B | 11/2002 |

OTHER PUBLICATIONS

3GPP Group Core Network: "TS 29.207 V5.5.0:Policy control over Go interface (Release 5)", Sep. 2003, p. 9 and 22.

(Continued)

*Primary Examiner* — Kiet Doan
*Assistant Examiner* — Michael Vu
(74) *Attorney, Agent, or Firm* — Charles E. Eggers (57) ABSTRACT

A method and apparatus for providing policy control in a wireless communication system. A mobile station generates a resource request for a communication service, where the resource request includes an identifier uniquely identifying a type of communication service. A packet data serving node receives the resource request for the communication service and selects a policy control entity to process the resource request. The selection by the packet data serving node is based at least on the identifier. The selected policy control entity performs policy control on the resource request.

30 Claims, 5 Drawing Sheets

OTHER PUBLICATIONS

3GPP Group Services and System Aspects: "TS 23.207 V6.0.0: End-to-end Quality of Service concept and architecture." Sep. 2003, p. 12, 21, 34, 40.

Hamer et al. "RFC 3520: Session Authorization Policy Element" Apr. 2003. p. 2 and 6.

3GPP Group Services and System Aspects: "TS 23.228 V.6.3.0: IP Multimedia Subsystem." Sep. 2003. p. 147 and 152.

International Search Report, PCT/US04/036839, International Searching Authority, European Patent Office, Mar. 7, 2005.

Written Opinion, PCT/US04/036839, International Searching Authority, European Patent Office, Mar. 7, 2005.

International Preliminary Report on Patentability, PCT/US04/036839, International Preliminary Examining Authority, United States, May 22, 2006.

3GPP Group Services and System Aspects: "TS 23.228 V.6.3.0: "IP Multimedia Subsystem (IMS)"" Sep. 2003, 3GPP, XP002318205 pp. 27 and 146-152.

"3rd Generation Partnership Project 2 "3GPP2" Revision D of the cdma2000 Standard".

Taiwan Search Report—TW093133681—TIPO—Sep. 8, 2011.

* cited by examiner

METHOD AND APPARATUS FOR POLICY CONTROL ENHANCEMENT IN A WIRELESS COMMUNICATION SYSTEM

CLAIM OF PRIORITY UNDER 35 U.S.C. §119

This application claims priority to U.S. Provisional Application No. 60/517,454 filed Nov. 4, 2003, entitled "3GPP2 Policy Control Enhancement," by A C Mahendran et al., and assigned to the assignee hereof and hereby expressly incorporated by reference herein.

BACKGROUND

1. Field

The present invention relates generally to communication systems, and, more specifically, to a method and apparatus for policy control enhancement in a wireless communication system.

2. Background

Wireless communication technologies have seen explosive growth over the past several years. This growth has been primarily fueled by wireless services providing freedom of movement to the communicating public as opposed to being "tethered" to a hard-wired communication system. It has further been fueled by the increasing quality and speed of voice and data communications over the wireless medium, among other factors. As a result of these enhancements in the communications field, wireless communications has had, and will continue to have, a significant impact on a growing number of the communicating public.

Typically, a mobile station communicating in a wireless communication system is afforded various types of communication services, which may include SIP-based services, stream-based (streaming) services, among other types of services. The mobile station will usually generate a resource reservation request for a particular communication service, and the resource request is either accepted or rejected based upon policy control as determined by a policy decision function (PDF) that is specific to the type of service requested by the mobile station. The policy decision function will typically make a policy decision on the mobile station's resource request based at least in part upon a user profile associated with the mobile station making the resource request and network policy. Generally, however, the policy decision function does not have direct access to the user profile of the mobile station making the resource request since it is usually not involved in the user authentication process.

The resource request generated by the mobile station is typically received at a packet data serving node (PDSN), which forwards the resource request to a policy decision function (PDF) that makes a policy decision of whether to grant the resource request to the mobile station. As mentioned, each policy decision function is service-specific, and only makes policy decisions for resource requests of a specific type of communication service that it handles. For example, a mobile station may request a certain amount of bandwidth allocation from the wireless communication system for a streaming service. The policy control for the allocation of bandwidth for streaming service is handled by a particular policy decision function of the network; whereas another policy decision function may handle resource requests for another type of communication service (such as SIP-based services, for example).

A problem that occurs is that the packet data serving node is typically ignorant of the communication resource request service type requested by the mobile station. Consequently, the packet data serving node is not aware of which policy decision function to contact to handle the specific type of resource request initiated by the mobile station, which may decrease the expediency in which the resource request is handled. Another problem that exists is that, since the policy decision function needs to obtain the requesting mobile station's user profile to make a policy decision, the PDF's policy decision on the mobile's resource request may be impeded as a result of not having direct access to the mobile's user profile because the PDF is not involved in the user authentication process.

The present invention is directed to overcoming, or at least reducing the effects of, one or more problems indicated above.

SUMMARY

In one aspect of the invention, a method in a wireless communication system is provided. The method comprises generating a resource request for a communication service, the resource request including an identifier uniquely identifying a type of communication service and receiving the resource request for the communication service. The method further includes selecting a policy control entity to process the resource request, the selecting being based at least on the identifier, and performing policy control by the selected policy control entity on the resource request.

In another aspect of the invention, an apparatus is provided. The apparatus comprises means for generating a resource request for a communication service, the resource request including an identifier uniquely identifying a type of communication service and means for receiving the resource request for the communication service. The apparatus further includes means for selecting a policy control entity to process the resource request, the selecting being based at least on the identifier, and means for performing policy control by the selected policy control entity on the resource request.

In another aspect of the invention, a wireless communication system is provided. The wireless communication system comprises a mobile station for generating a resource request for a communication service, the resource request including an identifier uniquely identifying a type of communication service. A packet data serving node is provided for receiving the resource request for the communication service and selecting a policy decision function to process the resource request, the selecting being based at least on the identifier, and wherein the selected policy decision function performs policy control on the resource request.

In yet another aspect of the invention, a mobile station in a wireless communication system is provided. The mobile station comprises a processor for generating a resource request for a communication service, the resource request including an identifier uniquely identifying a type of communication service. The mobile station further comprises a transmitter for transmitting the resource request for the communication service to a communication node. The communication node selects a policy control entity to process the resource request, the selecting being based at least on the identifier, and wherein the selected policy control entity performs policy control on the resource request.

In yet another aspect of the invention, a computer-readable storage medium programmed with a set of instructions that perform a method is provided. The method includes generating a resource request for a communication service, the resource request including an identifier uniquely identifying a type of communication service and receiving the resource request for the communication service. The method further includes selecting a policy control entity to process the resource request, the selecting being based at least on the identifier, and performing policy control by the selected policy control entity on the resource request.

DETAILED DESCRIPTION

Figure 1:
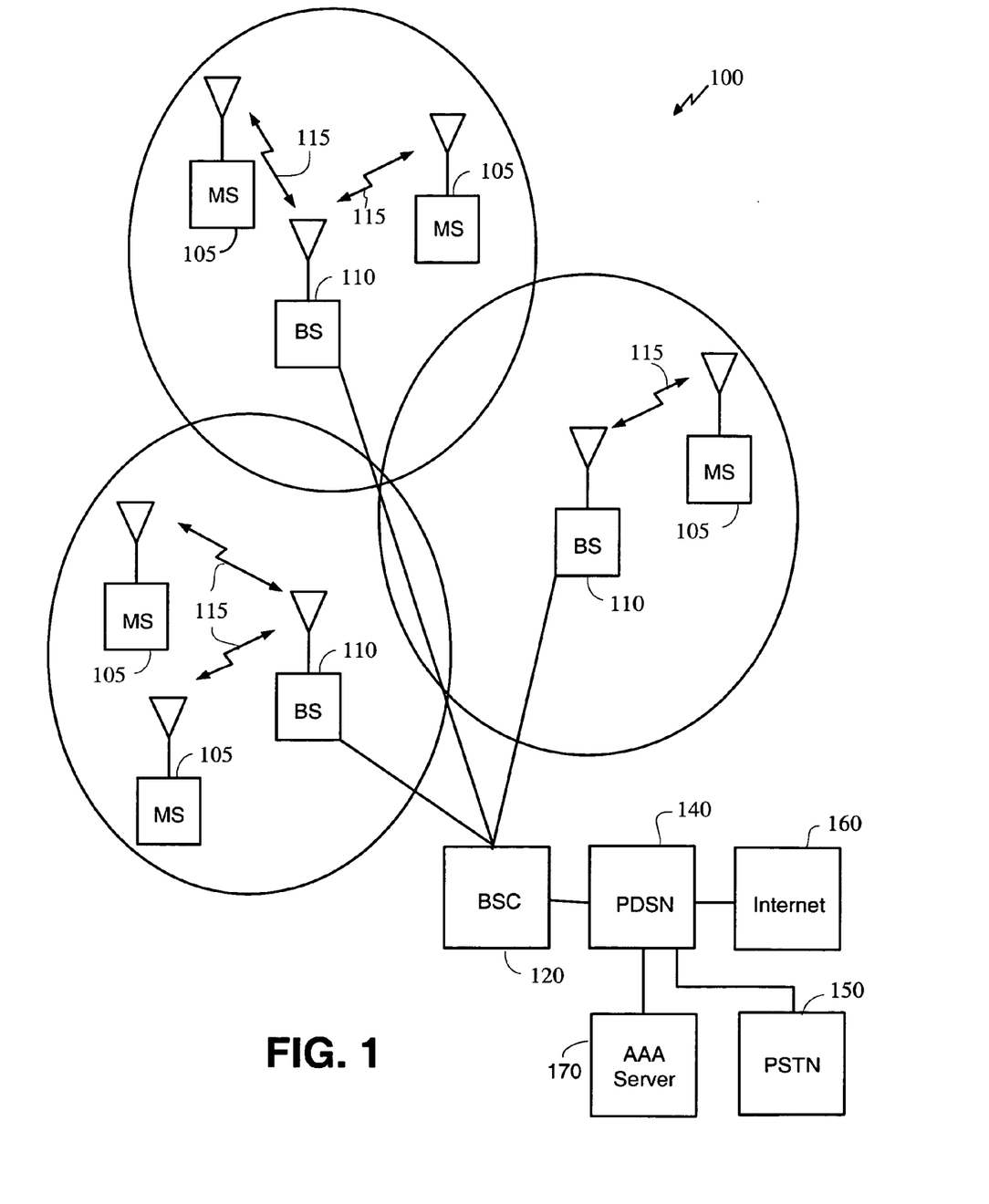
FIG. 1 is a block diagram of a wireless communication system in accordance with one illustrative embodiment of the present invention.

Turning now to the drawings, and specifically referring to FIG. 1, a wireless communication system 100 is shown in accordance with one embodiment of the present invention. The wireless communication system 100 comprises a plurality of mobile stations (MS) 105 that communicate with a plurality of base stations (BS) 110, which are geographically dispersed to provide continuous communication coverage with the mobile stations 105 as they traverse the wireless communication system 100.

The mobile stations 105 may, for example, take the form of wireless telephones, personal information mangers (PIMs), personal digital assistants (PDAs), laptop computers, or other types of computer terminals that are configured for wireless communication. The base stations 110 transmit data to the mobile stations 105 over a forward link of a wireless communication channel 115, and the mobile stations 105 transmit data to the base stations 110 over a reverse link of the wireless communication channel 115.

In one embodiment, the wireless communication system 100 conforms generally to a release of the cdma2000 specification. Cdma2000 is a 3rd Generation (3G) wireless communication standard. In accordance with the illustrated embodiment, the wireless communication system 100 is intended to operate utilizing 3GPP2 ($3^{rd}$ Generation Partnership Project) Revision D of the cdma2000 standard. In an alternative embodiment, the wireless communication system 100 may operate in accordance with Release 6 of the W-CDMA (Wideband Code Division Multiple Access) standard, but other embodiments may be implemented in other releases of the W-CDMA standard. It will be appreciated that the embodiments described herein should be considered as exemplary rather than limiting. Accordingly, the system 100 may take the form of various other types of wireless communication systems without departing from the spirit and scope of the present invention, and, thus, need not necessarily be limited to the aforementioned examples.

Each base station 110 is coupled to a base station controller (BSC) 120, which controls connections between the base stations 110 and other communication system components of the wireless communication system 100. The base stations 110 and the base station controller 120 collectively form a radio access network (RAN) for transporting data to and from the plurality of mobile stations 105 that communicate within the wireless communication system 100. The base stations 110 are coupled to the base station controller 120 by backhaul communication links, which may take the form of wireline E1 or T1 links. The backhaul communication links, however, may alternatively be embodied using any one of a number of wired or wireless communication mediums including, but not necessarily limited to, microwave, optical fiber, and the like.

The simplified depiction of the wireless communication system 100 in FIG. 1 is merely for ease in conveying the present invention. It will be appreciated that the wireless communication system 100 may be configured with any number of mobile stations 105, base stations 110, and base station controllers 120 without departing from the spirit and scope of the present invention, and, thus, need not necessarily be limited to the example illustrated in FIG. 1.

In the illustrated embodiment, the base station controller 120 is coupled to various communication system components to effectively extend the communication capabilities available to the mobile stations 105 communicating within the wireless communication system 100. The communication system components include a packet data serving node (PDSN) 140, a public switched telephone network (PSTN) 150, and the Internet 160 for access by the mobile stations 105 communicating therein. Additionally, the wireless communication system 100 is configured with an Authentication, Authorization, and Accounting (AAA) server 170 to provide authentication and billing services for each of the mobile stations 105 communicating therein. The AAA server 170 maintains a user profile (not shown) for each of the mobile stations 105 communicating in the wireless communication system 100. The user profile includes information on various communication services afforded to the mobile station 105 by the wireless communication system 100, among various other information to provide authentication, authorization and accounting of the mobile station 105 by the AAA server 170. It will be appreciated that the wireless communication system 100 may be interfaced with various other types of communication system components without departing from the spirit and scope of the present invention. Additionally, there may be a connection between the PSTN 150, Internet 160, and AAA server 170 to the BSC 120 directly, as opposed to being coupled to the BSC 120 through the PDSN 140 as illustrated in FIG. 1.

Figure 2:
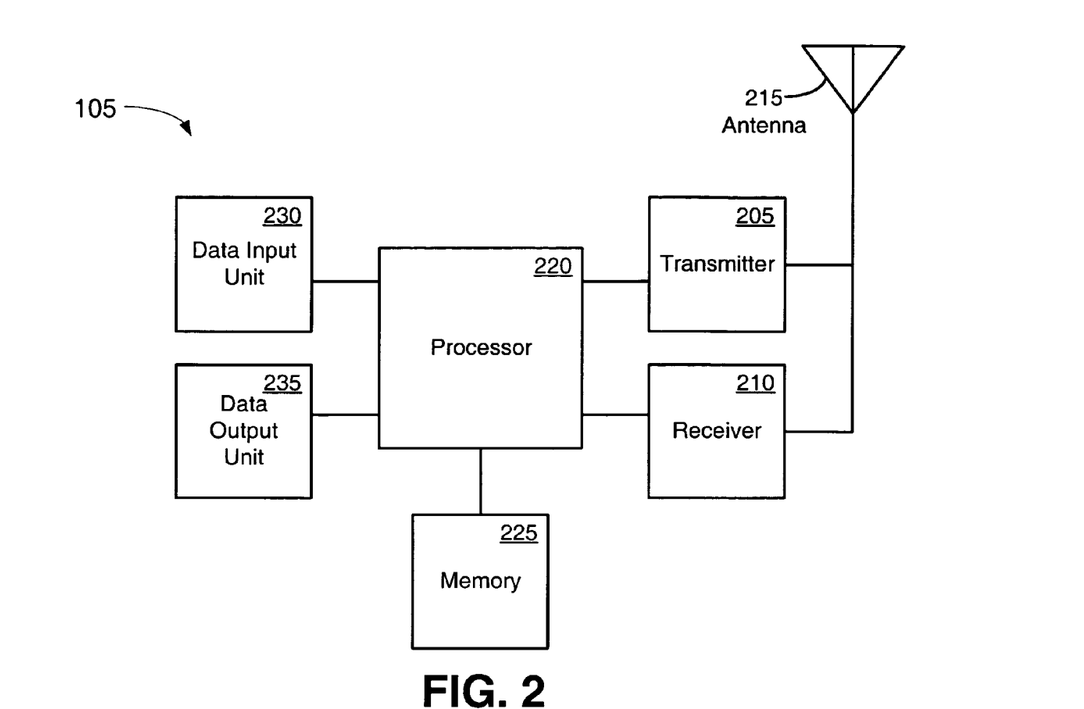
FIG. 2 shows a more detailed representation of a mobile station that communicates in the wireless communication system of FIG. 1.

Turning now to FIG. 2, a more detailed representation of the mobile station 105 is shown in accordance with one embodiment of the present invention. In one of its simpler forms, the mobile station 105 comprises a transmitter 205 for transmitting data over the reverse link of the wireless communication channel 115 to the base stations 110. The mobile station 105 also includes a receiver 210 for receiving data that is transmitted from the base stations 110 over the forward link of the wireless communication channel 115. In an alternative embodiment, the transmitter 205 and receiver 210 may be combined into a single transceiver unit as opposed to being embodied as two separate entities as illustrated in the figure. The transmitter 205 and the receiver 210 are coupled to an antenna 215 to facilitate the wireless transmission and reception of data between the mobile station 105 and the base stations 110 over the wireless communication channel 115.

The mobile station 105 further comprises a processor 220 for controlling various operating functions of the mobile station 105 and a memory 225 for storing data. In one embodiment, the processor 220 may take the form of a digital signal processor (DSP) chip. It will be appreciated, however, that the processor 220 may take the form of various other commercially-available processors or controllers.

The mobile station 105 also comprises a data input 230, coupled to the processor 220, which provides data for transmission by the mobile station 105 to the base stations 110 over the wireless communication channel 115. The data input 230 may take the form of a microphone or an input from a data generating device, such as a computer terminal, for example. It will be appreciated that the data input 230 may be implemented in various other forms to provide data to the processor 220, and, thus, need not necessarily be limited to the aforementioned examples.

The data received through the data input 230 is processed by the processor 220 and then forwarded to the transmitter 205 for transmission over the reverse link of the wireless communication channel 115 to the base stations 110. Data received by the receiver 210 over the forward link of the wireless communication channel 115 from the base stations 110 is forwarded to the processor 220 for processing and then to data output 235 for presentation to the user of the mobile station 105. The data output 235 may take the form of at least one of a speaker, visual display, and an output to a data device (e.g., a computer terminal), or any combination thereof. It will be appreciated that the data output 235 may comprise various other visual or aural perceptible devices, and, thus, need not necessarily be limited to the aforementioned examples. The simplified depiction of the mobile station 105 in FIG. 2 is merely for ease in conveying the present invention. Accordingly, it will also be appreciated that the mobile station 105 may include other components to enable various other features and/or capabilities of the mobile station 105 than those illustrated.

Figure 3:
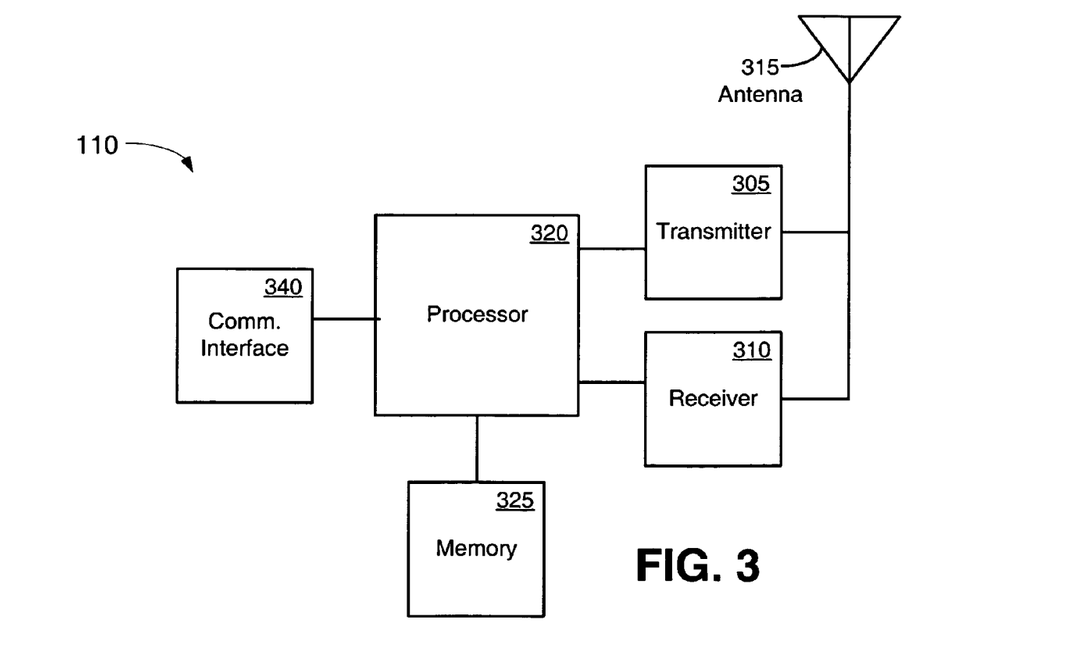
FIG. 3 depicts a more detailed representation of a base station within the wireless communication system of FIG. 1.

Referring now to FIG. 3, a more detailed representation of the base station 110 is shown in accordance with one embodiment of the present invention. In one of its simpler forms, the base station 110 comprises a transmitter 305 for transmitting data over the forward link of the wireless communication channel 115 to the mobile station 105, and a receiver 310 for receiving data that is transmitted from the mobile stations 105 over the reverse link of the wireless communication channel 115. In an alternative embodiment, the transmitter 305 and receiver 310 may be combined into a single transceiver unit as opposed to being embodied as two separate entities as illustrated. The transmitter 305 and the receiver 310 are coupled to an antenna 315 to facilitate the transmission and reception of data between the base station 110 and the mobile station 105 over the wireless communication channel 115.

The base station 110 is further configured with a processor 320 for controlling various operating functions and a memory 325 for storing data. In one embodiment, the processor 320 may take the form of a digital signal processor (DSP) chip. It will be appreciated, however, that the processor 320 may take the form of various other commercially-available processors or controllers without departing from the spirit and scope of the present invention. The base station 110 further comprises a communication interface 340 for interfacing the base station 110 to the base station controller 120. It will be appreciated that the base station 110 may be configured with additional components to perform a variety of other functions than those illustrated.

Referring back to FIG. 1, the PDSN 140 receives resource reservation requests for specific types of communication services desired by the mobile stations 105 within the wireless communication system 100. The resource reservation request generated by a particular mobile station 105 may include various types of communication services afforded to the mobile station 105 by the wireless communication system 100. For example, a resource reservation request by the mobile station 105 may include a request for 100 kbps of bandwidth for video. It will be appreciated, however, that the resource reservation request initiated by the mobile station 105 may include various other types of requests for communication services, and, thus, need not necessarily be limited to the aforementioned example.

Figure 4:
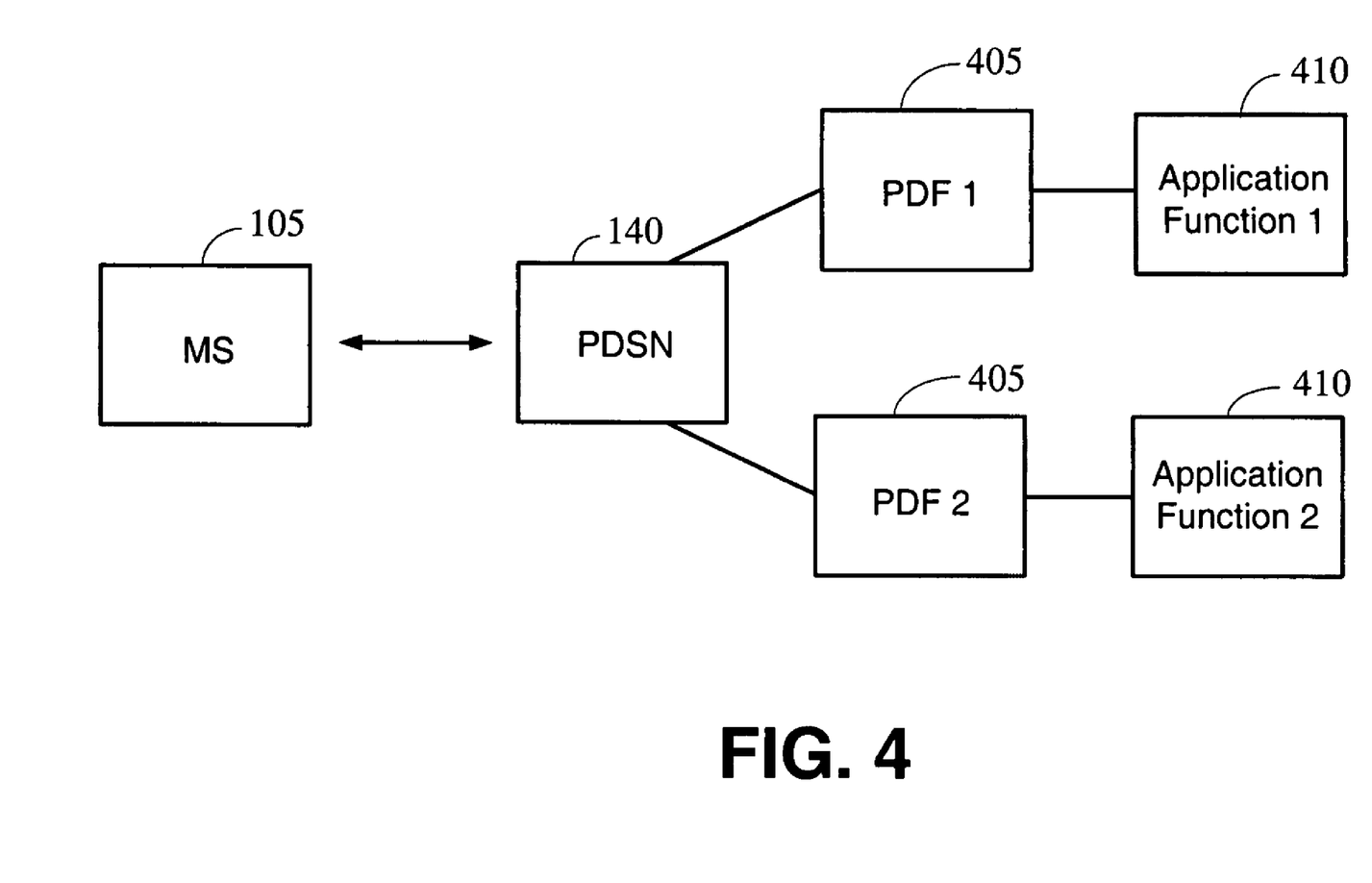
FIG. 4 is a block diagram illustrating a policy control architecture implemented in the wireless communication system of FIG. 1 according to one embodiment of the present invention.

Referring now to FIG. 4, an exemplary block diagram of a policy control architecture for the wireless communication system 100 is shown in accordance with one embodiment of the present invention. When a mobile station 105 initiates a resource reservation request for communication services, the PDSN 140 accesses one or more policy decision functions (PDFs) 405 that make a network policy decision on a particular mobile station's resource reservation request. The PDFs 405, in accordance with the illustrated embodiment, are configured to make policy decisions on the mobile stations' resource reservation requests based at least in part upon a user profile of the particular mobile station 105 generating the request and on network policy. The PDSN 140 may access different PDFs 405 depending on the type of service (e.g., SIP-based services, streaming-based services, etc.) requested by the mobile station 105 since each PDF 405 is service-specific.

Each PDF 405 is associated with at least one application function (AF) 410 for providing the resource reservation requested by the mobile station 105. The AF 410 does not provide policy control since the AF 410 is typically not provided with access to the user profile of the mobile station 105 and network policy. It will be appreciated that the number of PDFs 405 associated with the PDSN 140 need not necessarily be limited to the example illustrated in FIG. 4. Accordingly, the PDSN 140 may have associated therewith more or fewer PDFs 405 than the two illustrated without departing from the spirit and scope of the present invention.

Figure 5:
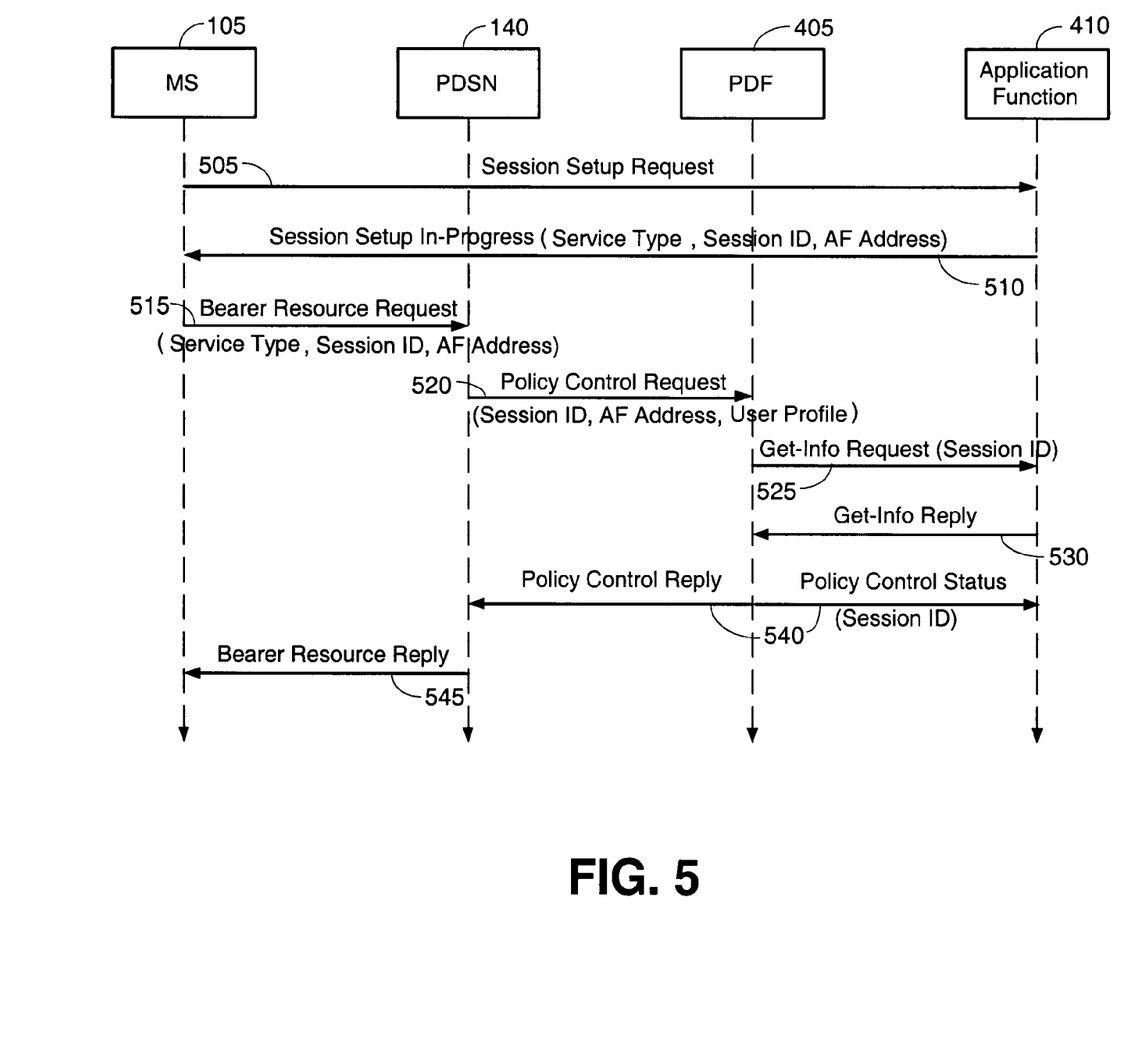
FIG. 5 shows a signaling flow diagram between a mobile station and the components of the policy control architecture of FIG. 4.

Referring now to FIG. 5, a signaling flow diagram between the mobile station 105 and the components of the policy control architecture (illustrated in FIG. 4) of the wireless communication system 100 is shown in accordance with one embodiment of the present invention. At 505, the mobile station 105 sends a Session Setup Request to the AF 410 that provides resource allocation for the communication service of the resource reservation request desired by the mobile station 105. For example, the mobile station 105 may make a request for 100 kbps of bandwidth for video. Accordingly, in this particular example, the Session Setup Request is sent to the particular application function (AF) 410 that provides the bandwidth allocation for video to the requesting mobile station 105. It will be appreciated, however, that the communication resource reservation request generated by the mobile station 105 may vary, and, thus, need not necessarily be limited to the aforementioned example.

In response to receiving the Session Setup Request message from the mobile station 105, the AF 410 sends a Session Setup In-Progress message to the mobile station 105. In accordance with one embodiment, the Session Setup In-Progress message includes a Service Type, Session ID, and AF address. The Service Type identifies the type of the application service (e.g., SIP-based services, stream-based services, etc.) that is being requested by the mobile station 105. The Session ID is a number chosen by the AF 410 to identify the particular session for the request generated by the mobile station 105. The AF address identifies the particular AF 410 that is configured to handle the request made by the mobile station 105. In one embodiment, the AF address may take the form of a Fully-Qualified Domain Name (FQDN). In an alternative embodiment, the AF address may take the form of an IP address. It will be appreciated, however, that the AF address need not necessarily be limited to a FQDN or IP address, but may take the form of other address types used to identify the particular AF 410 providing the particular service request without departing from the spirit and scope of the present invention.

At 515, the mobile station 105 sends a Bearer Resource Request message to the PDSN 140. The Bearer Resource Request message includes the Service Type, Session ID, and AF address that was provided to the mobile station 105 by the AF 410 handling the particular service request at 510. As previously mentioned, the PDSN 140 is configured with multiple PDFs 405 that are service-specific for the resource reservation request that is sent from the mobile station 105. Based on the Service Type field in the Bearer Resource Request message sent from the mobile station 105, the PDSN 140 has knowledge of which particular PDF 405 to query for policy control.

At 520, the PDSN 140 sends a Policy Control Request message to the PDF 405 associated with the indicated Service Type (received in the Bearer Resource Request message). According to one embodiment, the Policy Control Request message also includes the user profile associated with the particular mobile station 105 in addition to the Session ID and AF address. In one embodiment, the PDSN 140 may obtain the mobile station's user profile during the authentication phase of a packet data session establishment in the Authentication, Authorization, and Accounting (AAA) server Access-Accept from the mobile station's home AAA server 170.

At 525, the PDF 405 sends a Get-Info Request message to the AF 410 identified by the AF address provided in the received Policy Control Request message. In one embodiment, the Get-Info request message includes the Session ID, which was also included in the Policy Control Request message, to identify the particular session that pertains to the mobile station's resource reservation request to the AF 410. The Session ID is provided to the AF 410 such that the associated PDF 405 may obtain the session-related parameters requested by the mobile station 105 at 505.

At 530, the AF 410 that received the Get-Info Request message sends a Get-Info reply to the PDF 405 making the request to deliver the requested session-related parameters to the PDF 405. Upon receiving these session-related parameters from the AF 410, the PDF 405 subsequently makes a policy decision based on the mobile station's user profile and the session-related parameters defining the network policy.

At 540, the PDF 405 indicates the policy decision (i.e., an "accept" or "reject" decision) on the mobile station's resource reservation request to the PDSN 140 via a Policy Control Reply message. If the policy decision is a "reject" decision, the PDF 405 indicates the "reject" decision in a Policy Control Status message to the AF 410 so that it can release the session for the resource reservation request initiated by the mobile station 105. The PDSN 140 sends a Bearer Resource Reply message at 545 to the mobile station 105 indicative of the policy decision provided in the Policy Control Reply at 540. If the policy decision is an "accept" decision, the PDF 405 may send a Policy Control Status message to the AF 410, but the PDSN 140 allocates the appropriate bearer resource and sends the Bearer Resource Reply to the mobile station 105 at 545 to indicate the policy decision to the mobile station 105.

Figure 6:
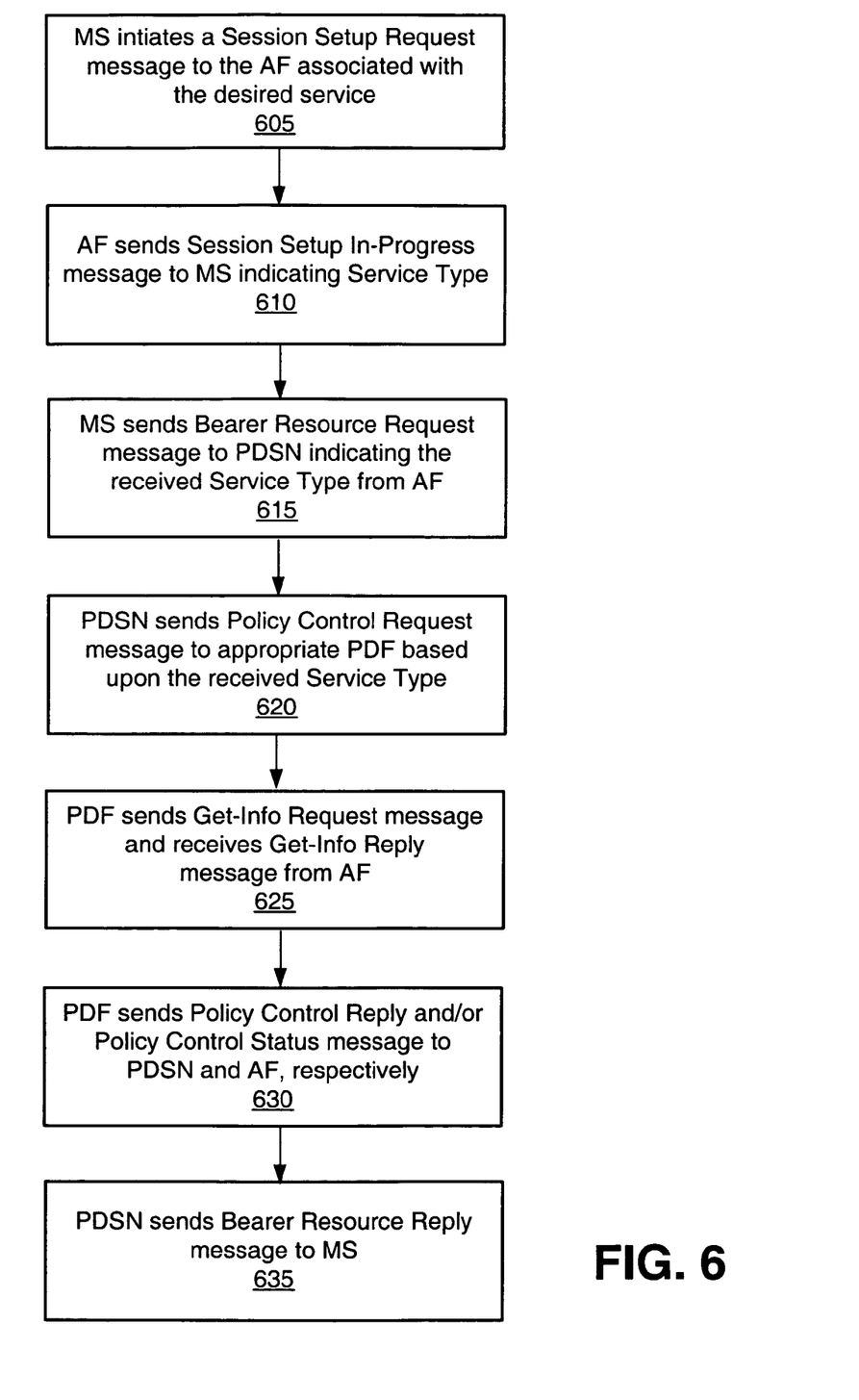
FIG. 6 illustrates a flow diagram of a process for providing policy control in a wireless communication system in accordance with one embodiment of the present invention.

Referring now to FIG. 6, a process for providing policy control for a resource reservation request generated by the mobile station 105 is shown according to one embodiment of the present invention. At block 605, the mobile station 105 sends a Session Setup Request to the AF 410 that provides the communication service for the resource reservation request desired by the mobile station 105. In response to receiving the Session Setup Request message from the mobile station 105 at block 605, the AF 410 sends a Session Setup In-Progress message to the mobile station 105 at block 610, which includes a Service Type, Session ID, and AF address. The Service Type identifies the type of the application service (e.g., SIP-based services, stream-based services, etc.) that is being requested by the mobile station 105. The Session ID is a number chosen by the AF 410 to identify the particular session for the request generated by the mobile station 105. The AF address identifies the particular AF 410 that is configured to handle the request made by the mobile station 105. In one embodiment, the AF address may take the form of a Fully-Qualified Domain Name (FQDN) or an IP address.

At block 615, the mobile station 105 sends a Bearer Resource Request message to the PDSN 140. The Bearer Resource Request message includes the Service Type, Session ID, and AF address that was provided to the mobile station 105 by the AF 410 handling the particular service request at 510. As previously mentioned, the PDSN 140 is configured with multiple PDFs 405 that are service-specific for the resource reservation request that is sent from the mobile station 105. Based on the Service Type field in the Bearer Resource Request message sent from the mobile station 105, the PDSN 140 has knowledge of which particular PDF 405 to query for policy control.

At block 620, the PDSN 140 sends a Policy Control Request message to the PDF 405 associated with the indicated Service Type (received in the Bearer Resource Request message). According to one embodiment, the Policy Control Request message also includes the user profile associated with the particular mobile station 105 in addition to the Session ID and AF address. In one embodiment, the PDSN 140 may obtain the mobile station's user profile during the authentication phase of a packet data session establishment in the Authentication, Authorization, and Accounting (AAA) server Access-Accept from the mobile station's home AAA server 170.

At block 625, the PDF 405 sends a Get-Info Request message to the AF 410 identified by the AF address provided in the received Policy Control Request message. In one embodiment, the Get-Info request message includes the Session ID, which was also included in the Policy Control Request message, to identify the particular session that pertains to the mobile station's resource reservation request to, the AF 410. The Session ID is provided to the AF 410 such that the associated PDF 405 may obtain the session-related parameters requested by the mobile station 105.

The AF 410 that received the Get-Info Request message sends a Get-Info reply to the PDF 405 making the request to deliver the requested session-related parameters to the PDF 405. Upon receiving these session-related parameters from the AF 410, the PDF 405 subsequently makes a policy decision based on the mobile station's user profile and the session-related parameters defining the network policy.

At block 630, the PDF 405 indicates the policy decision (i.e., an "accept" or "reject" decision) on the mobile station's resource reservation request to the PDSN 140 via a Policy Control Reply message. If the policy decision is a "reject" decision, the PDF 405 indicates the "reject" decision in a Policy Control Status message to the AF 410 so that it can release the session for the resource reservation request initiated by the mobile station 105. The PDSN 140 sends a Bearer Resource Reply message to the mobile station 105 at block 635 indicative of the policy decision provided in the Policy Control Reply message. If the policy decision is an "accept" decision, the PDF 405 may send a Policy Control Status message to the AF 410, but the PDSN 140 allocates the appropriate bearer resource and sends the Bearer Resource Reply to the mobile station 105 to indicate the policy decision to the mobile station 105.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method in a wireless communication system, comprising:
    receiving, from a mobile station at a packet data serving node (PDSN), a resource request for a communication service, the resource request including an identifier uniquely identifying a type of communication service and an address of an application entity configured to allocate resources for the communication service, the resource request further comprising a session identifier associated with the resource request, wherein the PDSN is ignorant of the type of communication service requested by the mobile station;
    selecting a policy control entity to process the resource request from among a plurality of policy control entities, each of the plurality of policy control entities configured to perform policy control for a single, different service type, respectively, the selecting being based at least on the identifier of the type of communication service; and
    sending from the PDSN to the selected policy control entity a policy control request to request policy control based on the resource request, the policy control request including the address of the application entity configured to allocate the resources for the communication service.

2. The method of claim 1, wherein the resource request is received in conjunction with a session setup request initiated by the mobile station with the application entity that allocates the communication service.

3. The method of claim 2, wherein the identifier is provided to the mobile station by the application entity in response to initiating the session setup request.

4. The method of claim 1, further comprising:
    obtaining at the PDSN a user profile associated with the mobile station generating the resource request; and
    sending the user profile to the policy control entity in the policy control request.

5. The method of claim 4, wherein the policy control that is requested by the policy control request is based at least in part on the user profile.

6. An apparatus, comprising:
    means for receiving, from a mobile station at a packet data serving node (PDSN), a resource request for a communication service, the resource request including an identifier uniquely identifying a type of communication service and an address of an application entity configured to allocate resources for the communication service, the resource request further comprising a session identifier associated with the resource request, wherein the PDSN is ignorant of the type of communication service requested by the mobile station;
    means for selecting a policy control entity to process the resource request from among a plurality of policy control entities, each of the plurality of policy control entities configured to perform policy control for a single, different service type, respectively, the selecting being based at least on the identifier of the type of communication service; and
    means for sending from the PDSN to the selected policy control entity a policy control request to request policy control based on the resource request, the policy control request including the address of the application entity configured to allocate the resources for the communication service.

7. The apparatus of claim 6, wherein the resource request is received in conjunction with a session setup request initiated by the mobile station with the application entity that allocates the communication service.

8. The apparatus of claim 7, wherein the identifier is provided to the mobile station by the application entity in response to initiating the session setup request.

9. The apparatus of claim 6, further comprising:
means for obtaining at the PDSN a user profile associated with the mobile station generating the resource request; and
means for sending the user profile to the policy control entity in the policy control request.

10. The apparatus of claim 9, wherein the policy control that is requested by the policy control request is based at least in part on the user profile.

11. A wireless communication system, comprising:
a mobile station for generating a resource request for a communication service, said resource request including an identifier uniquely identifying a type of communication service and an address of an application entity configured to allocate resources for the communication service, the resource request further comprising a session identifier associated with the resource request; and
a packet data serving node (PDSN) configured to (1) receive the resource request, (2) select, based at least on said identifier of the type of communication service, a policy decision function to process said resource request from among a plurality of policy control entities, each of the plurality of policy control entities configured to perform policy control for a single, different service type, respectively, and (3) send from the PDSN to the policy decision function a policy control request associated with the resource request, the policy control request including an address of the application entity configured to allocate the resources for the communication service, wherein the PDSN is ignorant of the type of communication service requested by the mobile station;
wherein said policy decision function is configured to perform policy control on said resource request.

12. The system of claim 11, wherein said mobile station initiates a session setup request with the application entity.

13. The system of claim 12, wherein said mobile station receives the identifier uniquely identifying the type of communication service from the application entity in response to initiating said session setup request.

14. The system of claim 11, wherein said packet data serving node obtains a user profile associated with the mobile station generating the resource request and sends the user profile to the policy decision function in the policy control request.

15. The system of claim 14, wherein said policy decision function performs policy control on said resource request based at least in part on said user profile.

16. A mobile station in a wireless communication system, said mobile station comprising:
a processor for generating a resource request for a communication service, said resource request including an identifier uniquely identifying a type of communication service and an address of an application entity configured to allocate resources for the communication service, the resource request further comprising a session identifier associated with the resource request; and
a transmitter for transmitting said resource request for said communication service to a communication node;
wherein said communication node is configured to (1) receive the resource request, (2) select, based at least on said identifier of the type of communication service, a policy control entity to process said resource request from among a plurality of policy control entities, each of the plurality of policy control entities configured to perform policy control for a single, different service type, respectively, and (3) send from the communication node to the policy control entity a policy control request associated with the resource request, the policy control request including an address of the application entity configured to allocate the resources for the communication service, wherein said communication node is ignorant of the type of communication service requested by the mobile station;
wherein said selected policy control entity performs policy control on said resource request.

17. The mobile station of claim 16, wherein said processor initiates a session setup request with the application entity.

18. The mobile station of claim 17, further comprising:
a receiver for receiving the identifier uniquely identifying the type of communication service from the application entity in response to initiating said session setup request.

19. The mobile station of claim 16, wherein said communication node obtains a user profile associated with the mobile station and sends the user profile to the policy control entity.

20. The mobile station of claim 19, wherein said selected policy control entity performs policy control on said resource request based at least in part on said user profile.

21. A non-transitory computer-readable medium programmed with a set of instructions that perform a method, comprising:
receiving, from a mobile station at a packet data serving node (PDSN), a resource request for a communication service, the resource request including an identifier uniquely identifying a type of communication service and an address of an application entity configured to allocate resources for the communication service, the resource request further comprising a session identifier associated with the resource request, wherein the PDSN is ignorant of the type of communication service requested by the mobile station;
selecting a policy control entity to process the resource request from among a plurality of policy control entities, each of the plurality of policy control entities configured to perform policy control for a single, different service type, respectively, the selecting being based at least on the identifier of the type of communication service; and
sending from the PDSN to the selected policy control entity a policy control request to request policy control based on the resource request, the policy control request including the address of the application entity configured to allocate the resources for the communication service.

22. The non-transitory computer-readable medium of claim 21, wherein the resource request is received in conjunction with a session setup request initiated by the mobile station with the application entity that allocates the communication service.

23. The non-transitory computer-readable medium of claim 22, wherein the identifier is provided to the mobile station by the application entity in response to initiating the session setup request.

24. The non-transitory computer-readable medium of claim 21, wherein the method further comprises:
obtaining at the PDSN a user profile associated with the mobile station generating the resource request; and sending the user profile to the policy control entity in the policy control request.

25. The non-transitory computer-readable medium of claim 24, wherein the policy control that is requested by the policy control request is based at least in part on the user profile.

26. A communication system, comprising:
a plurality of policy control entities, each of the plurality of policy control entities configured to perform policy control for a single, different service type, respectively;
an application function configured to:
receive a session setup request from a mobile station, and
send a session setup in-progress message to the mobile station in response to the session setup request, wherein the session setup in-progress message includes an identifier uniquely identifying a type of communication service; and
a packet data serving node (PDSN) configured to:
receive a resource request from the mobile station, wherein the resource request comprises the identifier and an address of the application function, and wherein the resource request further comprises a session identifier associated with the resource request;
select a selected policy control entity, among the plurality of policy control entities, to perform policy control based on the resource request, wherein the selection of the policy control entity is based on the identifier of the type of communication service, and wherein the PDSN is ignorant of the type of communication service requested by the mobile station, and
send to the selected policy control entity a policy control request associated with the resource request, the policy control request including the address of the application function.

27. An apparatus comprising:
a processor;
a memory storing instructions that when executed by the processor cause the apparatus to:
receive, from a mobile station at a packet data serving node (PDSN), a resource request for a communication service, the resource request including an identifier uniquely identifying a type of communication service and an address of an application entity configured to allocate resources for the communication service, the resource request further comprising a session identifier associated with the resource request, wherein the PDSN is ignorant of the type of communication service requested by the mobile station;
select a policy control entity to process the resource request from among a plurality of policy control entities, each of the plurality of policy control entities configured to perform policy control for a single, different service type, respectively, the selecting being based at least on the identifier of the type of communication service; and
send from the PDSN to the selected policy control entity a policy control request to request policy control based on the resource request, the policy control request including the address of the application entity configured to allocate the resources for the communication service.

28. A method in a wireless communication system, comprising:
generating, at a mobile station, a resource request for a communication service, said resource request including an identifier uniquely identifying a type of communication service and an address of an application entity configured to allocate resources for the communication service, the resource request further comprising a session identifier associated with the resource request; and
transmitting, by said mobile station, said resource request for said communication service to a communication node;
wherein said communication node is configured to (1) receive the resource request, (2) select, based at least on said identifier of the type of communication service, a policy control entity to process said resource request from among a plurality of policy control entities, each of the plurality of policy control entities configured to perform policy control for a single, different service type, respectively, and (3) send from the communication node to the policy control entity a policy control request associated with the resource request, the policy control request including an address of the application entity configured to allocate the resources for the communication service, wherein said communication node is ignorant of the type of communication service requested by the mobile station; and
wherein said selected policy control entity performs policy control on said resource request.

29. A mobile station in a wireless communication system, said mobile station comprising:
means for generating a resource request for a communication service, said resource request including an identifier uniquely identifying a type of communication service and an address of an application entity configured to allocate resources for the communication service, the resource request further comprising a session identifier associated with the resource request; and
means for transmitting said resource request for said communication service to a communication node;
wherein said communication node is configured to (1) receive the resource request, (2) select, based at least on said identifier of the type of communication service, a policy control entity to process said resource request from among a plurality of policy control entities, each of the plurality of policy control entities configured to perform policy control for a single, different service type, respectively, and (3) send from the communication node to the policy control entity a policy control request associated with the resource request, the policy control request including an address of the application entity configured to allocate the resources for the communication service, wherein said communication node is ignorant of the type of communication service requested by the mobile station; and
wherein said selected policy control entity performs policy control on said resource request.

30. A non-transitory computer-readable medium for wireless communication, comprising:
at least one instruction for generating a resource request for a communication service, said resource request including an identifier uniquely identifying a type of communication service and an address of an application entity configured to allocate resources for the communication service, the resource request further comprising a session identifier associated with the resource request; and
at least one instruction for transmitting said resource request for said communication service to a communication node;
wherein said communication node is configured to (1) receive the resource request, (2) select, based at least on said identifier of the type of communication service, a policy control entity to process said resource request from among a plurality of policy control entities, each of the plurality of policy control entities configured to perform policy control for a single, different service type, respectively, and (3) send from the communication node to the policy control entity a policy control request associated with the resource request, the policy control request including an address of the application entity configured to allocate the resources for the communication service, wherein said communication node is ignorant of the type of communication service requested by the mobile station; and wherein said selected policy control entity performs policy control on said resource request.

* * * * *